United States Patent
Cahill et al.

(10) Patent No.: US 12,119,870 B2
(45) Date of Patent: Oct. 15, 2024

(54) OPTICAL CHANNEL MONITOR WITH BUILT-IN SENSORS FOR DYNAMIC MEASUREMENTS

(71) Applicant: II-VI Delaware, Inc., Wilmington, DE (US)

(72) Inventors: Michael J. L. Cahill, Hampton (AU); Glenn D. Bartolini, Lexington, MA (US); Jiang-Huai Zhou, Windham, NH (US); Yajun Wang, Naperville, IL (US)

(73) Assignee: II-VI Delaware, Inc., Wilmington, DE (US)

( * ) Notice: Subject to any disclaimer, the term of this patent is extended or adjusted under 35 U.S.C. 154(b) by 110 days.

(21) Appl. No.: 18/081,366

(22) Filed: Dec. 14, 2022

(65) Prior Publication Data

US 2024/0204869 A1 Jun. 20, 2024

(51) Int. Cl.
*H04B 10/079* (2013.01)

(52) U.S. Cl.
CPC . *H04B 10/07955* (2013.01); *H04B 10/07957* (2013.01)

(58) Field of Classification Search
CPC .................. H04B 10/07955; H04B 10/07957
USPC ............................................................ 398/38
See application file for complete search history.

(56) References Cited

U.S. PATENT DOCUMENTS

| | | | | |
|---|---|---|---|---|
| 6,407,376 B1 * | 6/2002 | Korn | .................... | H04B 10/077 398/79 |
| 6,993,257 B2 * | 1/2006 | Althouse | .......... | H04B 10/07955 398/95 |
| 9,705,604 B2 * | 7/2017 | Sone | ................ | H04B 10/07955 |
| 2003/0035163 A1 * | 2/2003 | Althouse | .............. | H04B 10/077 398/5 |
| 2007/0098411 A1 * | 5/2007 | Ghera | .............. | H04B 10/07955 398/177 |
| 2013/0251365 A1 * | 9/2013 | Sone | .................... | H04J 14/0201 398/38 |
| 2016/0294479 A1 * | 10/2016 | Sone | ........................ | H04J 14/02 |

FOREIGN PATENT DOCUMENTS

CA 2565709 A1 * 12/2005 ............. H04B 10/40

\* cited by examiner

*Primary Examiner* — Abbas H Alagheband
(74) *Attorney, Agent, or Firm* — Wendy W. Koba

(57) ABSTRACT

An optical channel monitor is formed to include the capability to sense real-time changes in optical power across signal bands (optical power changes including, for example, a complete drop out of the signal band) and quickly measure the resulting spectrum, thus enabling the host to initiate advanced power balancing solutions that mitigate the extent of the power change until a permanent fix is provided. A set of signal band sensors is included with a conventional OCM, where each sensor includes a photodetector that is able to detect changes in operation along its associated incoming signal band. Control electronics are used to monitor the states of the photodetectors, with the ability to invoke an OCM scan of the complete wavelength range when a power change condition is flagged.

20 Claims, 5 Drawing Sheets

OPTICAL CHANNEL MONITOR WITH BUILT-IN SENSORS FOR DYNAMIC MEASUREMENTS

TECHNICAL FIELD

Optical channel monitors (OCMs) and, more particularly, an OCM that incorporates additional band sensing to implement real-time spectral power measurements is disclosed herein.

BACKGROUND

Optical networks are found in a wide variety of high speed applications, and used to provide efficient transmission of voice, video, and data signals. Some optical networks implement wavelength division multiplexing (WDM) to increase network bandwidth. In WDM optical networks, multiple optical channels occupying distinct wavelengths/frequencies are multiplexed into a single optical signal for transmission through a single optical fiber.

Error rates in long-haul WDM optical networks depend on, among other things, per channel optical power and optical signal-to-noise ratio (OSNR) values. Modules such as optical amplifiers have been found to degrade the OSNR, as well as produce power ripple across the optical band for the transmission channels. To remedy these problems, WDM optical networks often implement systems that perform optical channel power monitoring and/or optical channel power correction to maintain optimal channel powers thus ensuring low data error rates.

Various types of optical channel monitors (OCMs) have been developed to perform these functions, and in general are configured to measure the multiple wavelengths used within a WDM network, with OCMs disposed at disparate locations throughout the network. The power level of each optical channel may be reported in real time by the OCM to a "host" (such as a Network Management System (NMS)), which uses this information to optimize the optical power level for each channel, identify performance drift, and verify system functionality.

To increase the transmission capacity of today's high-speed WDM optical transmission systems, the wavelength range used to support signal transmission has grown from the standard C-band wavelength range (~1530-1565 nm) to include the L-band wavelength range (~1565-1610 nm), often described as the C+L bands. The presence of stimulated Raman scattering (SRS) between wavelengths in the C-band and L-band is known to result in the transfer of power from the shorter wavelengths in the C-band to the longer wavelengths in the L-band. Therefore, when configuring systems to use the C+L bands, the gain settings for the amplifiers are adjusted to account for SRS to ensure adequate signal transmission. Known solutions include providing signal pre-emphasis, as well as the use of "gain tilt" in the optical amplifiers.

While these techniques are useful in general, in situations where there is a complete failure of one of the two bands, the standard gain settings for the surviving band are non-optimal. For example, causing saturation or nonlinearities in power distribution across the C-band spectrum if the L-band is dropped (related to an excess of transmission power). Alternatively, if the C-band transmission drops out for some reason, the remaining L-band signal may exhibit high levels of bit error, perhaps even loss of signal (related to too little remaining transmission power). Even a failure of a portion of a defined band (or sub-band) may result in degrading the performance of the rest of the system to the extent that significant data errors are introduced.

Indeed, the required time interval from photodetector detection of a potential problem to scanning using an OCM is a limiting factor in the responsiveness of the NMS to make a change in the system.

SUMMARY

Disclosed herein is an OCM that includes the capability to sense real-time drop-out (or significant changes in optical power) of complete signal bands (or sub-bands) and quickly measure the resulting spectrum, thus enabling the host to initiate advanced power balancing solutions that avoid the issues described above.

The capability is provided by incorporating a set of signal band (or sub-band) sensors with a conventional OCM, where each sensor includes a photodetector that is able to detect changes in operation along its associated incoming signal band. For present purposes, "changes" may be defined in terms of a significant drop in power reaching the photodetector, indicative of a substantial (perhaps complete) loss of transmission in the associated band. Control electronics are used to monitor the states of the photodetectors, with the ability to invoke an OCM scan of the complete wavelength range when a drop-out condition is flagged.

The disclosed principles are also well-suited for use in applications where an optical switch is used in combination with an OCM (i.e., in applications where the OCM is used to sequentially monitor the incoming signal along a set of input ports), incorporating taps, wavelength filters and photodetectors to again recognize drop-out of a wavelength range at any of the input ports.

In situations where multiple OCMs are used to cover a particular wavelength range, the sensor system may be configured to ensure that there is a proper pairing between each OCM and sets of photodetectors covering that wavelength range.

An example embodiment may take the form of a rapid response optical channel monitor (OCM) system that comprises the combination of an OCM and a band sensor. The OCM is responsive to a WDM optical input signal and used for measuring an optical power level associated with each channel of the WDM signal. The band sensor is used for recognizing a change in optical power within a defined wavelength band of the WDM optical input signal. In particular, the band sensor comprises a wavelength filtering element responsive to the WDM optical input signal for creating as an output therefrom a plurality of band-limited optical signals spanning the complete wavelength range of the WDM optical input signal. The band sensor further includes a plurality of sensing devices coupled to receive the plurality of band-limited optical signals from the filtering element in a one-to-one relationship, each sensing device configured to generate a first output if the incoming optical power is greater than a defined threshold and a second output if the incoming optical power is not greater than the defined threshold. A monitor is coupled to the plurality of sensing devices and configured to generate a scan control signal for transmission to the OCM upon any of the sensing devices generating the second output, indicating a drop in optical power within the associated signal band.

Another embodiment may take the form of an optical communication system comprising a multiport (N×1) optical switch, an OCM, and a band sensor. The multiport optical switch is formed to include a plurality of N input ports and a single output port, each input port receiving a separate WDM input signal including a plurality of wavelength channels. The OCM is coupled to the single output port of the multiport optical switch and used for monitoring, in a sequence, the WDM input signal provided at each input port. The band sensor is coupled to the plurality of N input ports of the multiport optical switch and particularly configured to recognize a change in optical power within a defined wavelength channel at any input port of the plurality of N input ports. In this case, the band sensor comprises a plurality of N wavelength filtering elements (as described above), a plurality of sensing devices (as described above), and a monitor coupled to the plurality of sensing devices. The monitor is configured to generate a scan control signal upon any of the sensing devices generating the second output, indicating a loss of optical power within the associated signal band at an identified input port.

Another example arrangement from this disclosure may take the form of an optical monitoring system based on using a set of individual optical channel monitors, each optical channel monitor configured to monitor a different wavelength range within an incoming broadband optical signal. In this case, the band sensor is responsive to the incoming broadband optical signal and includes a wavelength filtering element responsive to the broadband optical input signal, creating as an output therefrom a plurality of band-limited optical signals spanning the complete wavelength range of the broadband optical input signal. A plurality of sensing devices is coupled to receive the plurality of band-limited optical signals in a one-to-one relationship, each sensing device configured to generate a first output if the incoming optical power is greater than a defined threshold and a second output if the incoming optical power is not greater than the defined threshold. A monitor is coupled to the plurality of sensing devices and is configured to recognize the second output from a sensing device as a loss of power signal, and to identify an appropriate OCM from the set of OCMs utilized for monitoring the wavelength range covering the loss of power band. The monitor is also configured to transmit a scan control signal to the appropriate OCM, instructing the appropriate OCM to perform a complete wavelength scan of its associated wavelength range.

Yet another arrangement as described in this disclosure may take the form of an optical sensor for recognizing a change in optical power within a defined wavelength band of a broadband optical input signal. Here, the sensor includes a wavelength filtering element responsive to the broadband optical input signal for creating as an output therefrom a plurality of band-limited optical signals (the plurality spanning the wavelength range of the broadband optical input signal), a plurality of sensing devices coupled to receive the plurality of band-limited optical signals in a one-to-one relationship (each sensing device configured to generate a first output if the incoming optical power is greater than a defined threshold value and a second output if the incoming optical power is not greater than the defined threshold), and a monitor coupled to the plurality of sensing devices and configured to generate a scan control signal upon any of the sensing devices generating the second output, indicating a change in optical power within the associated signal band.

Other and further embodiments and aspects of the disclosed rapid-response OCM will become apparent during the course of the following discussion and by reference to the accompanying drawings.

BRIEF DESCRIPTION OF THE DRAWINGS

Referring now to the drawings.

DETAILED DESCRIPTION

Figure 1:
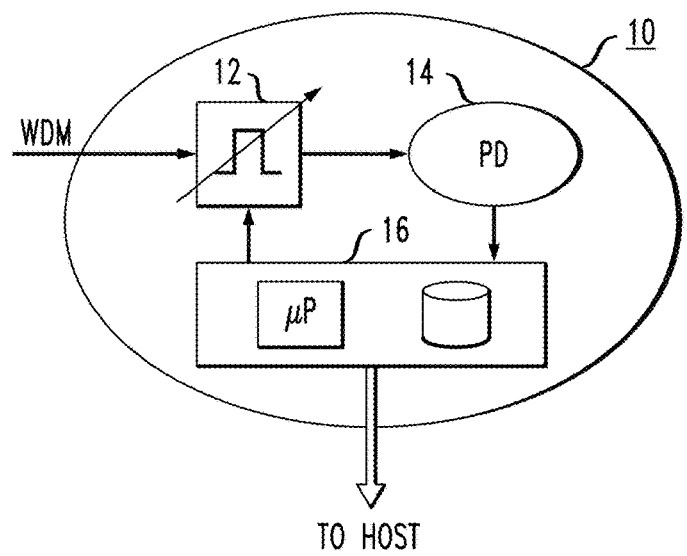
FIG. 1 is a high-level illustration of a typical OCM.

FIG. 1 contains a high-level block diagram of a conventional OCM 10. As shown, OCM 10 includes a tunable bandpass filter 12, a photodetector 14 and a control component 16. OCM 10 is positioned at a point within an optical network (such as in an optical node, for example as a reconfigurable optical add/drop multiplexer (ROADM)), where a WDM transmission signal enters or exits the node. At least a portion of the propagating beam is directed into OCM 10 (using an optical tap, for example). As shown in FIG. 1, the WDM light entering OCM 10 is applied as an input to tunable bandpass filter 12. The center wavelength of bandpass filter 12 is adjusted by control component 16 in a manner that steps through a set of individual signal bands (channels), each channel associated with a specific center wavelength. Photodetector 14 is used to convert the optical power present within each center wavelength into a representative electrical value. The pairing of center wavelength and measured optical power may be stored in a database within control component 16 and/or sent to a remote host location (such as a network management system (not shown)).

An OCM based on the arrangement described above has been a standard optical network component for quite some time. While functioning well in standard optical networks using only optical wavelengths in a relatively short wavelength band, such as the C-band range of 1525-1565 nm, problems have developed in newer configurations that utilize a wider wavelength range. For example, with the deployment of systems based on C+L bands (which span the wavelength range from 1525-1625 nm), there is a need to optimize the gain settings for both the C-band amplifiers and the L-band amplifiers under the presumption that both bands are fully operational. If either band fails, the gain settings for the remaining band are no longer optimized and the system performance may be compromised. Using a standard OCM, such as shown in FIG. 1, the time period involved in detecting the loss of a complete band, identifying the source of the problem, and correcting the band failures may take upwards of seconds, even minutes, which is far too long for today's high-speed data communication systems.

Figure 2:
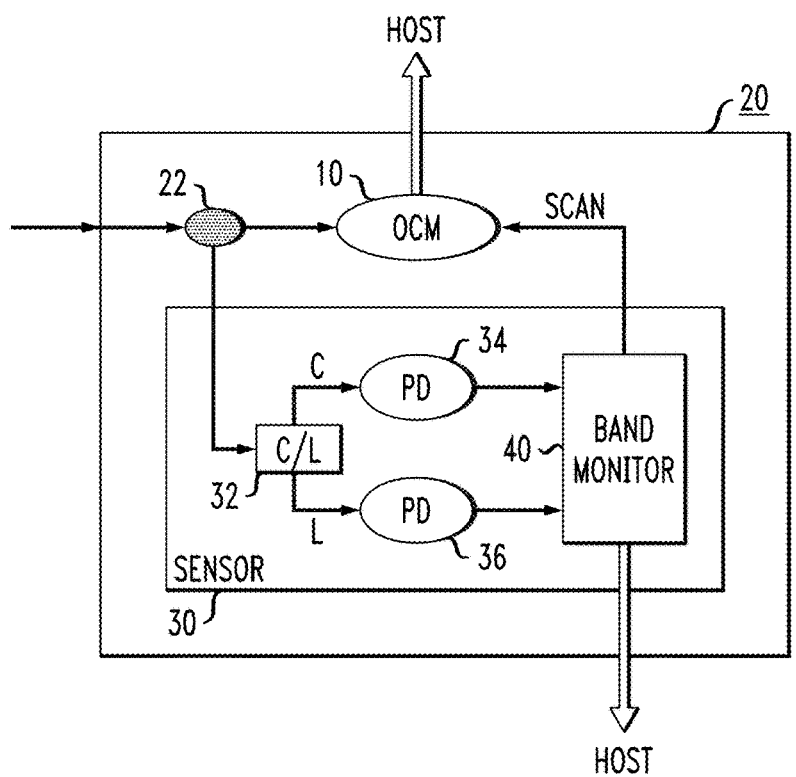
FIG. 2 illustrates an example of an OCM system that uses a band drop-out sensor in combination with a typical OCM.

FIG. 2 is a block diagram of one example of the disclosed OCM system 20 that has been developed to address this problem by immediately sensing a loss (drop-out) of a complete wavelength band within the incoming WDM signal. In particular, a band "drop-out" sensor 30 is used in combination with OCM 10 and configured to quickly recognize a significant drop in power in an identified band. By quickly recognizing the wavelength band that has failed, sensor 30 is able to command OCM 10 to begin a complete wavelength scan (or a scan of any appropriate wavelength range). It is contemplated that OCM system 20 may be used to monitor a relatively wide wavelength range, for example the C+L bands. As will be described below, sensor 30 may be configured to immediately recognize a significant drop in optical power within, for example, the C-band signal and thereafter activate OCM 10 to invoke a full scan across the complete C+L bands (or any selected portion of the C+L bands). It is likely that sensor 30 will also send an alarm signal to a remote host (e.g., an NMS) as a "flag" to inform the remote host of the drop-out of the identified wavelength band. It is to be understood that while from time to time in the following discussion the phrase "drop out" is used to define a sensing signal output from a photodetector, the "drop out" in a strict sense means a power level that falls below a defined threshold; thus, there may truly be a complete loss of power (i.e., a band dropping out of service), or a wavelength band experiencing problems to the degree that its associated output power is significantly reduced. At times, the phrase "drop out" may be used to indicate either of these conditions.

As shown in FIG. 2, a power splitter 22 is included at the input to OCM system 20 and used to direct one portion of the incoming light into OCM 10 and a second, remaining portion into sensor 30. Continuing with the example of using WDM signals in the C+L bands as an input to OCM system 20, sensor 30 is shown as including a wavelength filter 32 that is designed to direct the wavelength range associated with C-band transmission portion (i.e., 1525-1565 nm) into a first photodetector 34 and the L-band transmission portion (i.e., 1565-1625 nm) into a second photodetector 36. The outputs from photodetectors 34, 36 are provided as separate inputs to a band "drop-out" monitor 40 (referred to at times hereafter as "band monitor 40", or simply "monitor 40").

The combination of photodetectors 34, 36 and monitor 40 is used as a threshold detecting arrangement for recognizing a change in optical power that is larger than a pre-determined amount (i.e., a binary decision). In one case, the change in optical power may be a complete "drop out" of all WDM signals within a given band, and the combination of photodetectors 34, 36 and monitor 40 will be able to differentiate between the "presence" or "absence" of optical power (again, a binary decision). For example, if first photodetector 34 does not register a power level above a certain noise floor threshold, this indicates a drop-out of the entire C-band wavelength range. Monitor 40 recognizes this below threshold reading as a C-band drop-out and sends a control signal to OCM 10 for it to start a scan of the complete wavelength range (i.e., have tunable bandpass filter 12 (see FIG. 1) perform a complete center wavelength sweep from one end of the wavelength range to the other). Monitor 40 may also transmit a band drop-out status signal to the host. Once OCM 10 completes the scan, this information can be transmitted to the host so that the proper corrective actions may be taken, or stored locally in OCM 10 and await a request from the host for the data once the host detects that status signal from OCM.

Obviously, a similar sequence of events would occur if monitor 40 senses a low power (perhaps complete loss of power) output from photodetector 36 associated with the L-band portion of the incoming WDM optical signal. In this case, monitor 40 invokes OCM 10 to perform a wavelength scan (of the L-band, or the C+L bands, or any other appropriate wavelength range) and perhaps also transmit an "L-band drop-out" alarm to the remote host. It is to be understood that while monitor 40 is illustrated as a separate component, its functionality may be incorporated within control component 16 of OCM 10, if both sensor 30 and OCM 10 are assembled in a single unit ab initio.

Figure 3:
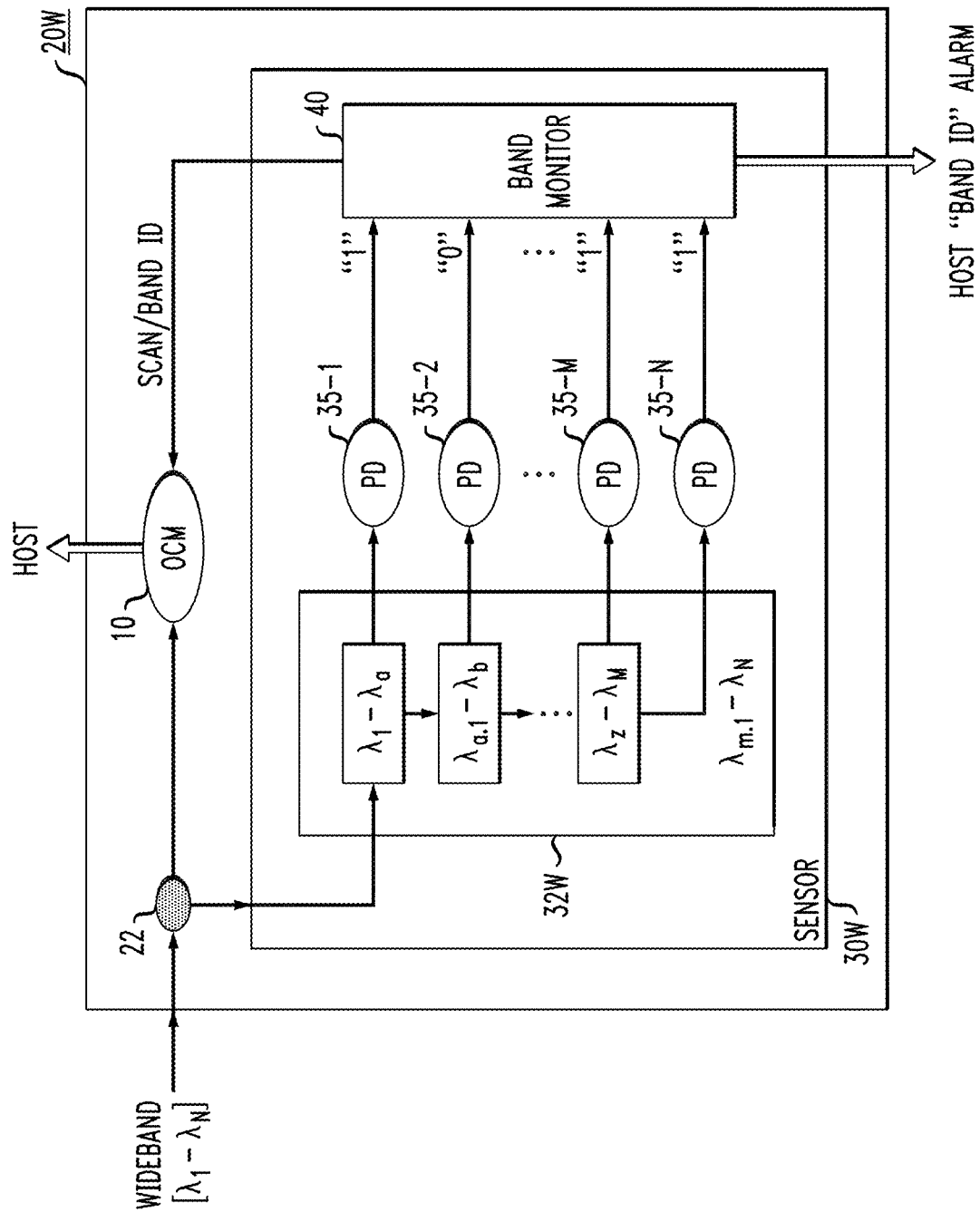
FIG. 3 illustrates an OCM system that includes another band drop-out sensor configuration, in this case using an array of sensing devices used to monitor power levels in different portions of the incoming wavelength range.

FIG. 3 is a diagram of another example of the disclosed rapid-response OCM system, in this example referred to as a wideband OCM system 20W, where the term "wideband" may possibly define a different wavelength range than the C+L bands described above. A band sensor 30W of wideband OCM 20W is shown as comprising a wavelength filtering element 32W that includes a plurality of individual bandpass filters 32-1, 32-2, . . . , 32-M, each configured to pass a different band (or sub-band) within the defined limits of the incoming wideband signal. Thus, each individual bandpass filter 32-$i$ provides a different band-limited optical output signal indicative of either "above" a threshold power level, or "below" a threshold power level. An individual photodetector 35-$i$ is paired with each bandpass filter 32-$i$, converting the band-limited optical input into an electrical signal indicative of the optical power present in that band. The set of "sensing" electrical output signals from photodetectors 35 is provided as sensor inputs (i.e., either "above" or "below" a defined power threshold) to monitor 40.

It is to be understood that various arrangements of wavelength filter component 30W may be used. In the particular configuration of FIG. 3, the incoming wideband signal is first passed through filter 32-1, which filters out a wavelength range from $\lambda_1$-$\lambda_a$, and passes the remainder of the signal into filter 32-2. Filter 32-2 is designed to direct the wavelength range $\lambda_{a.1}$-$\lambda_b$ into photodetector 35-2, and so on, with filter 32-M directing a wavelength range $\lambda_z$-$\lambda_M$ into photodetector 35-M. In this approach, the upper limit of the wavelength range (i.e., $\lambda_M$-$\lambda_N$) into photodetector 35-N. Alternatively, the complete wideband input may be directed into each individual filter 32-1 through 32-M, still creating the same set of band-limited optical output signals.

As with the arrangement of FIG. 2, monitor 40 of OCM system 20W is configured to recognize a "change in optical power" from any of the photodetectors, and will trigger OCM 10 to begin a full scan when the power drops below a defined threshold (where a "zero" power is associated with a complete drop-out of the signal band). In the example of FIG. 3, the power measured by photodetector 35-2 has been recognized as falling below a threshold value (shown as a logic "0" in FIG. 3). All remaining photodetectors 35-1 and 35-3 through 35-N show a logic "1", indicating a receipt of the expected power level. It is possible, however, that in certain cases more than one photodetector may indicate a decrease in received optical power. Monitor 40 is preferably configured to not only recognize a change in signal power, but the identity(ies) of the band(s) associated with the change in power. Monitor 40 then transmits a control signal to OCM 10 (where a particular control signal may invoke a scan across only the specific band exhibiting a power drop, or across the complete wideband spectrum, or any other relevant wavelength range, depending on the particular application).

At the same time, monitor 40 may transmit the information regarding the particular band(s) (or sub-band) that has dropped out to a remote host. By virtue of knowing which input has experienced a loss of signal (in this example, photodetector 35-2), monitor 40 is able to identify the wavelength band associated with filter 32-2 and photodetector 35-2, passing the identification of the particular band (or bands, as the case may be) that has dropped out along to a remote host.

Figure 4:
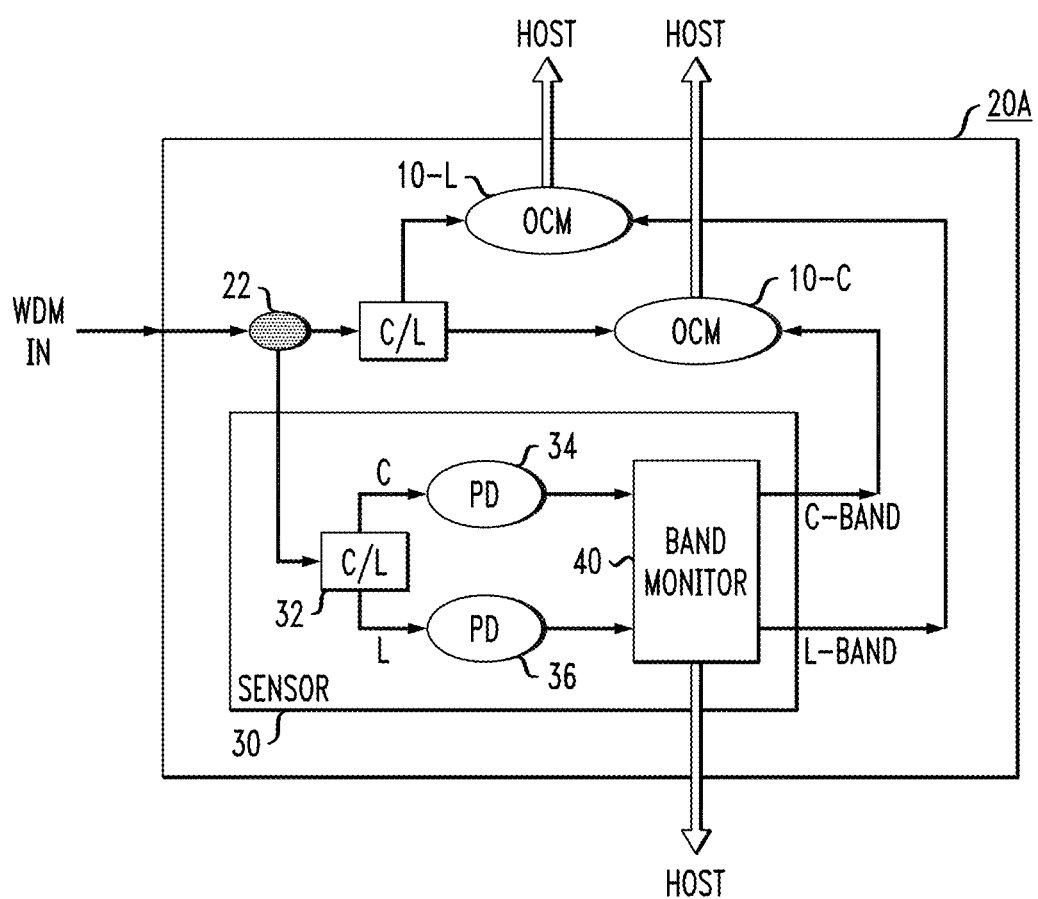
FIG. 4 illustrates yet another OCM system, in this case using a band drop-out sensor in combination with a pair of OCMs (each OCM configured to monitor a different wavelength range)

FIG. 4 illustrates a variation of the arrangement of FIG. 2, where in this case a pair of separate OCMs is used, one for monitoring WDM signals in the C-band and the other for monitoring WDM signals in the L-band. In this example, sensor 30 remains essentially the same as in FIG. 2, including C/L wavelength filter 32 and photodetectors 34, 36. As will be evident in the following, monitor 40 is configured to provide a pair of separate output scan signals, one for each OCM. Here, OCM system 20A is shown as including a second C/L wavelength filter 41, positioned along the input path immediately before the OCMS (i.e., beyond optical power splitter 22). Second C/L wavelength filter 41 is used in this case to direct the C-band portion of the incoming WDM signal into a first OCM, denoted as OCM 10-C in FIG. 4. The L-band portion of the incoming WDM signal is directed into a second OCM, denoted as OCM 10-L. The separate scan output signals from monitor 40 are provided as inputs to OCM 10-C and OCM 10-L, each output from monitor 40 to the appropriately-paired OCM 10.

Figure 5:
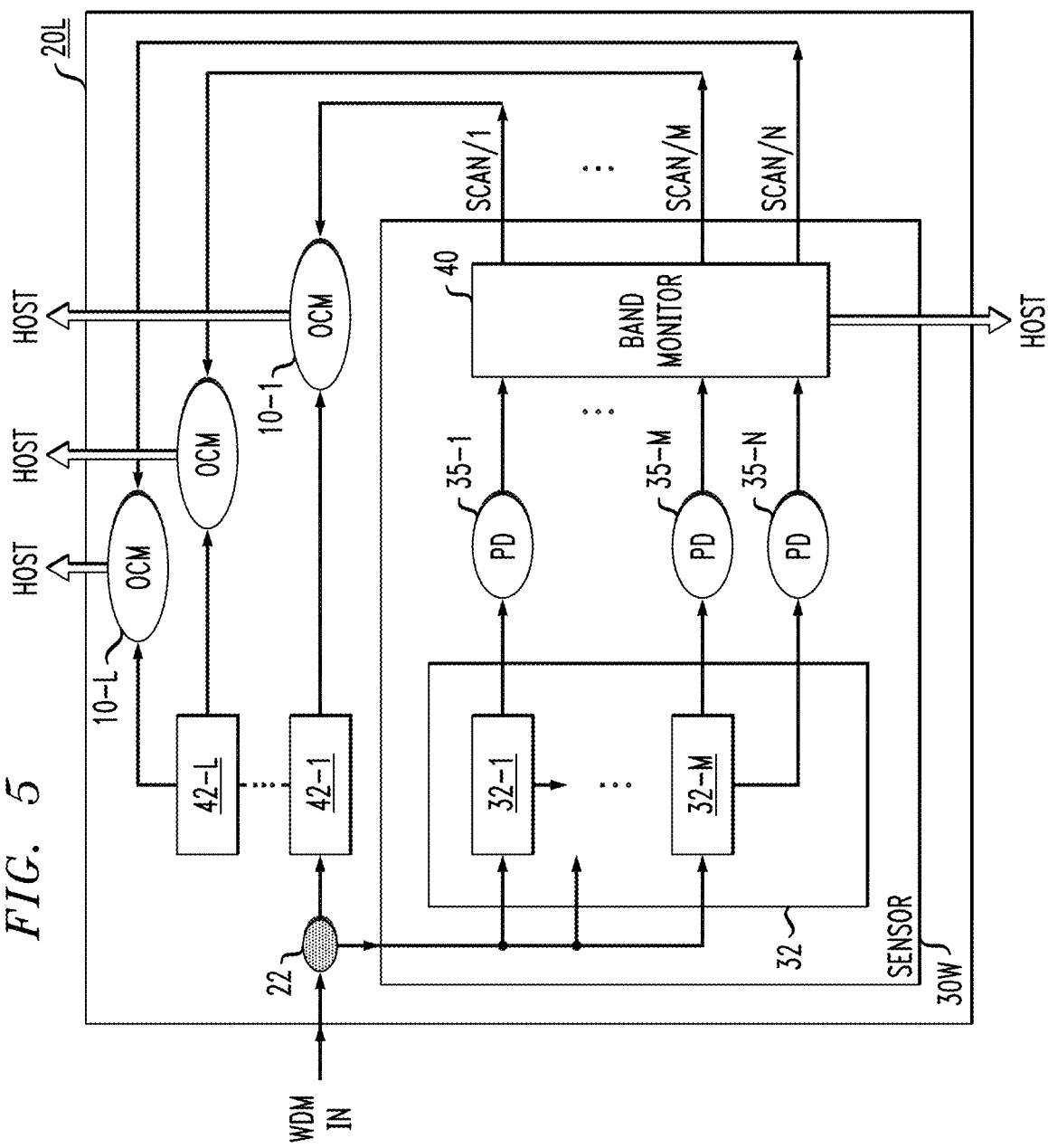
FIG. 5 shows an extension of the example shown in FIG. 4, in this case configuring a band drop-out sensor that may be used with a plurality of individual OCMs.

FIG. 5 shows an extension of this rapid-response capability to an example architecture that employs multiple OCMs. In this case, each OCM 10-1 through OCM 10-L is configured to monitor a different wavelength range within an incoming WDM signal, with a set of monitoring filters 42-1 through 42-L used to direct the proper wavelength range into each individual OCM. In this example, a sensor 30W similar to that described above may be used to monitor the complete incoming WDM signal band. In this configuration, a monitor 40L also needs to know the pairing between photodetectors 35 and OCMs 10 in order to direct a "scan" signal to the proper OCM when a drop out within a defined signal band is identified. A table is shown in FIG. 5 to illustrate one possible pairing, where the wavelength band associated with photodetector 35-1 is monitored by OCM 10-1. Continuing, the wavelength bands associated with photodetectors 35-2 through 35-4 are defined as monitored by OCM 10-2, with OCM 10-3 monitoring the bands associated with photodetectors 35-5 through 35-7. In this example as shown in the table, OCM 10-L is paired with photodetector 35-8 and used as a threshold power detector for the uppermost band within the input WDM wavelength range. Any type of "flag" communication sent by monitor 40 to a remote host also identifies the involved OCM in addition to the wavelength band that has dropped out.

In various applications, an OCM may be used in combination with a N×1 multi-port switch, where in this case the OCM steps through a monitoring process of each of the incoming ports. See, for example, U.S. Pat. No. 9,628,174 entitled "Optical Channel Monitor with Integral Optical Switch", and issued to the present applicant on Apr. 18, 2017.

Figure 6:
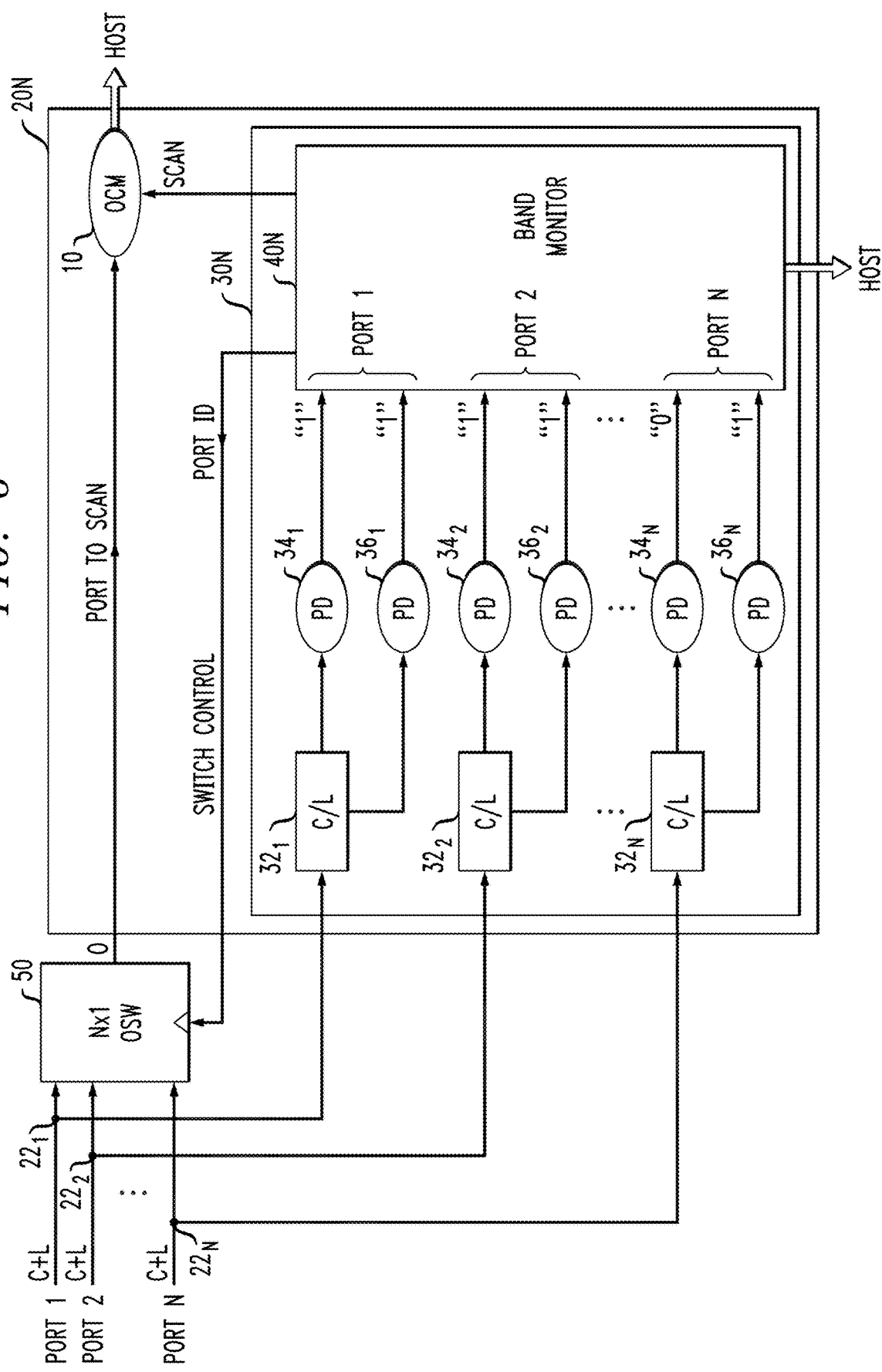
FIG. 6 illustrates an example of an OCM system in combination with an N×1 optical switch (N input ports, one output port), with the band drop-out sensor configured to simultaneously monitoring all of the input ports and provide an alarm output signal when any defined band at any of the input ports experiences a significant change in optical power (including the possibility of power changes occurring at multiple input ports, thus providing multiple alarm signals).

FIG. 6 illustrates a use of the disclosed rapid-response OCM system 20N in combination with an N×1 optical switch 50. For the sake of discussion, it is presumed in this example that each input port of optical switch 50 supports transmission across the C+L bands. Therefore, an included band sensor 30N is formed to include a plurality of N (e.g.) C/L filters $32_1$-$32_N$, each coupled to a separate one of the input ports. Similar to the arrangement as shown in FIG. 2, a pair of photodetectors 34, 36 is disposed at the output of each filter 32 and used to sense the presence or absence of a particular signal band at the associated port. This is but one example, in general each input port may receive a WDM signal of a different wavelength range, with its associated wavelength filtering element 32 modified accordingly.

As shown in FIG. 6, an optical tap 22; is disposed at each input port, and is used to direct a selected power fraction of the incoming signal into a wavelength filter $32_i$ paired with that input port. With respect to input port 1, the WDM input is directed into C/L wavelength filter $32_1$. The C-band output is applied as an input to a photodetector $34_1$ and the L-band signal as an input to a photodetector $36_1$. For input port 2, the tapped-out signal from tap $22_2$ passes through a wavelength filter $32_2$, with the C-band portion applied as an input to a photodetector 342 and the L-band to a photodetector $36_2$. This pairing continues, a shown, with the signal from input port N passing through filter $32_N$ and directed into the photodetector pair $34_N$, $36_N$. Simply put, band sensor 30N consists of a plurality of N replications of sensor 30 as discussed above. The complete array of outputs from all of the photodetectors are applied as individual inputs to a monitor 40N, which is configured to recognize the "port address" associated with each photodetector pair, as well as the identification of a particular band (at the identified port) that is experiencing signal loss, passing this information on to both OCM 10 and a remote host. It is quite possible that any point in time, more than one input port could be experiencing a loss of signal. Monitor 40N is able to recognize and identify each port experiencing loss, transmitting the set of port identifications to optical switch 50.

Advantageously, the arrangement as shown in FIG. 6 is able to find a drop-out at any of the input ports, regardless of which port is currently being monitored by OCM 10. For example, presume that OCM 10 is currently performing a scan of the input signal along port 2 (that is, optical switch 50 is set to couple input port 2 to output port O). Also presume that the C-band portion of the transmission appearing at port N has dropped out, as recognized by photodetector $34_N$. Monitor 40N is able to respond to this drop in communication at port N and instruct optical switch 50 to switch from port 2 to port N, optical switch 50 thereafter providing the signal from port N as the input to OCM 10. Monitor 40N also commands OCM 10 to perform a full scan of the signal received at input port N.

While different implementations have been described in this disclosure, it is to be understood that these implementations are only examples and not exhaustive of the various configurations of a rapid-response OCM that may be contemplated by those skilled in the art. The appended claims are presented in a form that captures all of these configurations, whether or not explicitly described above.

What is claimed is:

1. A rapid-response optical channel monitor (OCM) system, comprising
    an OCM responsive to a wavelength division multiplexing (WDM) optical input signal for measuring an optical power level associated with each channel of the WDM signal; and
    a band sensor for recognizing a change in optical power within a defined wavelength band of the WDM optical input signal, the band sensor comprising:
        a wavelength filtering element responsive to the WDM optical input signal and creating as an output therefrom a plurality of band-limited optical signal spanning the complete wavelength range of the WDM optical input signal;
        a plurality of sensing devices coupled to receive the plurality of band-limited optical signals in a one-to-one relationship, each sensing device configured to generate a first output if an incoming optical power is greater than a defined threshold and a second output if the incoming optical power is not greater than the defined threshold; and
a monitor coupled to the plurality of sensing devices and configured to generate a scan control signal upon any of the sensing devices generating the second output, indicating a loss of optical power within the associated signal band.

2. The rapid-response OCM system as defined in claim 1, wherein the monitor is further configured to transmit a wavelength band control signal to the OCM to initiate a scan of the signal band associated with the loss of optical power.

3. The rapid-response OCM system as defined in claim 2, wherein the OCM is further configured to transmit measurement results associated with the scanned signal band to a remote network host system.

4. The rapid-response OCM system as defined in claim 1, wherein the monitor is further configured to transmit a spectrum scan control signal to the OCM to initiate a scan of the complete wavelength range of the WDM optical input signal.

5. The rapid-response OCM system as defined in claim 4, wherein the OCM is further configured to transmit measurement results associated with the scan of the complete wavelength range to a remote network host system.

6. The rapid-response OCM system as defined in claim 1, wherein the monitor is further configured to transmit an optical power alarm signal to a remote network host system, identifying a signal band experiencing a change in optical power.

7. The rapid-response OCM system as defined in claim 1, where the wavelength filtering element comprises a single optical filter designed to separate a first wavelength range from a second wavelength range, creating as an output a plurality of two band-limited optical signals, each band-limited optical signal provided as an input to a separate one of a plurality of two sensing devices.

8. The rapid-response OCM system as defined in claim 7, wherein the single optical filter is designed to provide a C-band signal as a first band-limited optical signal and an L-band signal as a second band-limited optical signal.

9. The rapid-response OCM system as defined in claim 1, wherein the wavelength filtering element comprises a plurality of N individual optical filters, each filter providing as an output a different wavelength band from within the WDM optical input signal.

10. The rapid-response OCM system as defined in claim 1, wherein the plurality of sensing devices comprises a plurality of photodetectors.

11. An optical communication system, comprising
a multiport optical switch including a plurality of N input ports, N being an integer greater than one, and a single output port, each input port receiving a separate wavelength division multiplexing (WDM) optical input signal including a plurality of wavelength channels;
an optical channel monitor (OCM) coupled to the single output port of the multiport optical switch for monitoring, in a sequence, the WDM optical input signal provided at each input port; and
a band sensor coupled to the plurality of N input ports of the multiport optical switch for recognizing a change in optical power within a defined wavelength channel at any input port of the plurality of N input ports, the band sensor comprising
a plurality of N wavelength filtering elements, each responsive to a separate WDM optical input signal at an associated input port, each wavelength filtering element providing as an output therefrom a plurality of band-limited optical signal spanning the plurality of wavelength channels within the associated WDM optical input signal;
a plurality of sensing devices coupled to receive the plurality of band-limited optical signals from the plurality of N wavelength filtering elements in a one-to-one relationship, each sensing device configured to generate a first output if an incoming optical power is greater than a defined threshold and a second output if the incoming optical power is not greater than the defined threshold; and
a monitor coupled to the plurality of sensing devices and configured to generate a scan control signal upon any of the sensing devices generating the second output, indicating a loss of optical power within the associated signal band at an identified input port.

12. The optical communication system as defined in claim 11, wherein the monitor is further configured to:
transmit a switch control signal to the multiport optical switch to direct the multiport optical switch to couple the identified input port to the single output port; and
transmit a scan control signal to the OCM to initiate a complete wavelength scan of the WDM optical input signal arriving at the identified input port.

13. The optical communication system as defined in claim 11, wherein the monitor is further configured to transmit a port alarm signal to a remote network host system, identifying the affected signal band and identified input port associated with the affected signal band.

14. An optical monitoring system comprising
a set of individual optical channel monitors, each optical channel monitor configured to monitor a different wavelength range within an incoming broadband optical signal; and
a band sensor responsive to the incoming broadband optical signal, the band sensor comprising:
a wavelength filtering element responsive to the broadband optical input signal and creating as an output therefrom a plurality of band-limited optical signal spanning the complete wavelength range of the broadband optical input signal;
a plurality of sensing devices coupled to receive the plurality of band-limited optical signals in a one-to-one relationship, each sensing device configured to generate a first output if an incoming optical power is greater than a defined threshold and a second output if the incoming optical power is not greater than the defined threshold; and
a monitor coupled to the plurality of sensing devices and configured to recognize the second output from any sensing device of the plurality of sensing devices as a loss of power signal, and to identify an appropriate optical channel monitor from the set of individual optical channel monitors utilized for monitoring the wavelength range covering the loss of power band, the monitor also configured to transmit a scan control signal to the appropriate optical channel monitor, instructing the appropriate optical channel monitor to perform a complete wavelength scan of its associated wavelength range.

15. An optical sensor for recognizing a change in optical power within a defined wavelength band of a broadband optical input signal, the optical sensor comprising
a wavelength filtering element responsive to the broadband optical input signal and creating as an output therefrom a plurality of band-limited optical signal spanning the wavelength range of the broadband optical input signal;

a plurality of sensing devices coupled to receive the plurality of band-limited optical signals in a one-to-one relationship, each sensing device configured to generate a first output if an incoming optical power is greater than a defined threshold value and a second output if the incoming optical power is not greater than the defined threshold; and a monitor coupled to the plurality of sensing devices and configured to generate a scan control signal upon any of the sensing devices generating the second output, indicating a change in optical power within the associated signal band.

16. The optical sensor as defined in claim 15, wherein the monitor is further configured to transmit an optical power alarm signal to a remote network host system, identifying a signal band experiencing a change in optical power.

17. The optical sensor as defined in claim 15, where the wavelength filtering element comprises a single optical filter designed to separate a first wavelength range from a second wavelength range, creating as an output a plurality of two band-limited optical signals, each band-limited optical signal provided as an input to a separate one of a plurality of two sensing devices.

18. The optical sensor as defined in claim 17, wherein the single optical filter is designed to provide a C-band signal as a first band-limited optical signal and an L-band signal as a second band-limited optical signal.

19. The optical sensor as defined in claim 15, wherein the wavelength filtering element comprises a plurality of N individual optical filters, each filter providing as an output a different wavelength band from within the broadband optical input signal.

20. The optical sensor as defined in claim 15, wherein the plurality of sensing devices comprises a plurality of photodetectors.

* * * * *